J. L. SCHRODE.
GLOBE VALVE.
APPLICATION FILED APR. 15, 1909. RENEWED SEPT. 30, 1910.
991,095.
Patented May 2, 1911.
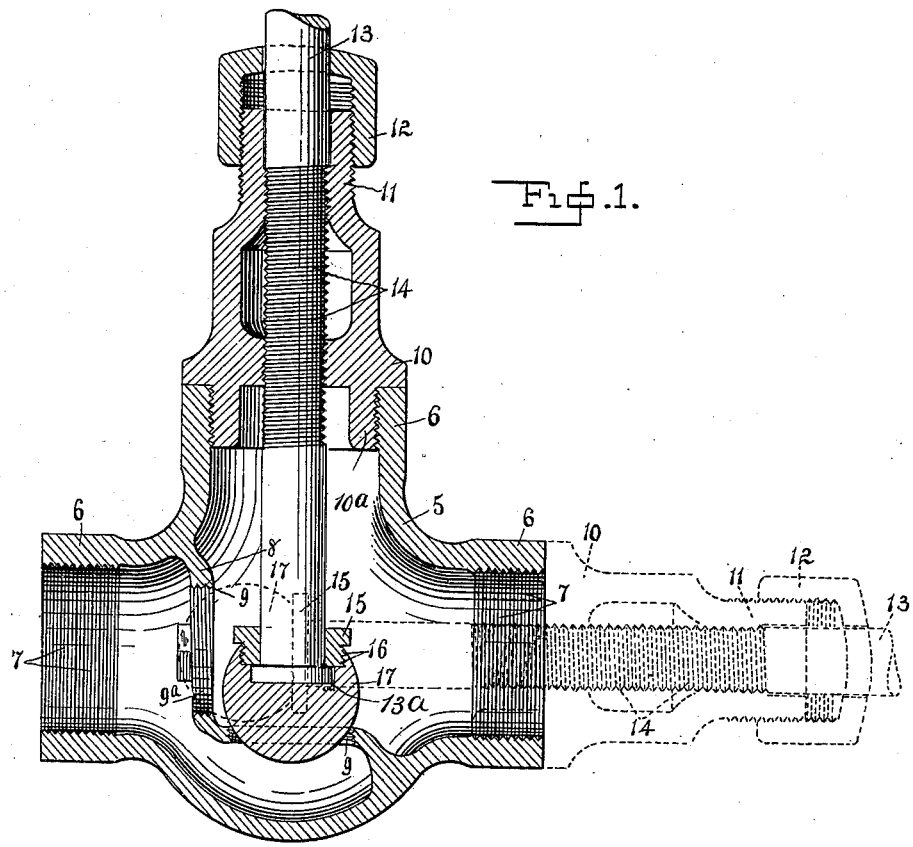
Fig. 1.
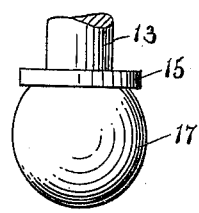
Fig. 2.
Fig. 3.
WITNESSES:
M. J. Marty
Chas. F. Barrett
INVENTOR
John L. Schrode
By Frederick Benjamin
Atty.

UNITED STATES PATENT OFFICE.

JOHN L. SCHRODE, OF HOPKINSVILLE, KENTUCKY, ASSIGNOR OF ONE-HALF TO FREDERICK W. NUNN, OF MARION, KENTUCKY.

GLOBE-VALVE.

991,095.  Specification of Letters Patent.  Patented May 2, 1911.

Application filed April 15, 1909, Serial No. 490,034. Renewed September 30, 1910. Serial No. 584,758.

*To all whom it may concern:*

Be it known that I, JOHN L. SCHRODE, citizen of the United States, residing at Hopkinsville, in the county of Christian and State of Kentucky, have invented certain new and useful Improvements in Globe-Valves, of which the following is a specification.

This invention relates to improvements in the style of valve described in my coördinate application for patent, the essential differences between the valve disclosed in said application and the one hereinafter described being that in the former one valve-seat is adapted to the valve-head irrespective of the relative position of the head, while in the present device, two seats are provided and means are disclosed for closing one of the seat openings when the valve is changed from the angle-form to the straight-way style, and vice-versa.

One of the objects of the hereinafter described improvements is to provide an interchangeable form of valve in which the seat can be readily renewed, and to so connect the valve-stem and valve proper that the latter will not necessarily turn with the turning of the stem in adjusting the valve on its seat.

In the accompanying drawing:—Figure 1 is a sectional view of my complete improved valve on a median line; Fig. 2 is a detail of the ball valve which I use, and Fig. 3 shows a modified form of seat for the ball-valve.

Referring to the details of the drawing 5 represents a valve body of globular form from which extend three necks 6 of uniform size and each having corresponding internal threads 7. Extending across the interior of the body is a partition or bridge 8 which is in the form of a right-angle, one side or wall of which is parallel with the horizontal necks, and the other is parallel with the vertical neck. In each of these partition walls is an opening provided with internal annular threads 9 to provide a seat for the ball-valve 17 to be described. When one of the seat openings is not in use it will be closed by the nut 9ª which is screwed into the female threads 9.

In Fig. 3 I have shown a threaded collar 4 having its inner face beveled, which may be screwed into the threaded opening 9 and thus provide a renewable seat for the ball-valve.

10 represents a bonnet which is formed with a threaded extension 10ª adapted to be screwed into any of the necks or extensions 6. The bonnet is also cast with an externally and internally threaded neck 11, the outer threads to receive the cap nut 12, and the inner threads to receive the threaded valve-stem 14.

The valve proper 17 is spherical and recessed and threaded as at 16 to receive the collar 15 which fits loosely over the lower end of the valve-stem. The ball-valve is also provided with a recess countersunk from the threaded recess, to receive loosely the flanged extremity 13ª of the valve-stem. This construction and arrangement permits the effective union between the valve and its stem, without causing the valve to rotate when the stem is turned in the operation of the valve.

As shown in full lines in the drawing, the device is arranged as a straightway valve, the plug 9ª being screwed into the openings in the vertical portion of the partition or bridge 8. In dotted lines I have shown the bonnet screwed into one of the horizontal extensions 6, and the ball-valve seated in the opening in the vertical wall. When so arranged, it will be understood that the plug 9ª will be transferred to the opening in the horizontal wall 8, and thus an angle-valve will be formed.

Having thus described my invention what I claim, is:—

1. A valve comprising a body portion having threaded radial extensions of uniform bore, a bridge extending across the said body and having two walls at an angle to each other, each of said walls having a threaded valve-seat therein, a bonnet adapted to be screwed into any of said extensions, and a valve proper having a stem passing through said bonnet.

2. A valve structure comprising a body having a plurality of tubular extensions, a bridge extending across the body and having threaded valve-seats arranged therein at right-angles to each other, and intersecting the vertical and horizontal axes of the body, a bonnet adapted to fit said extensions, a valve having a stem adjustable in said bonnet, and detachable means for closing one of the valve-seats when the other is in use, said means adapted to engage the threads in the valve-seats.

3. A valve-structure comprising a body having a plurality of tubular extensions and a bridge extending transversely of said body and having a plurality of threaded valve-seat openings therein, a collar adapted to be screwed into said openings and to furnish a valve-seat, a plug adapted to be screwed into said openings and to effect a closure therefor, a valve adapted to be seated on said seat, and a bonnet adapted to fit said extensions.

4. A valve-structure comprising a body having a plurality of tubular extensions, and a bridge extending across the body and having threaded valve seats arranged therein at right angles to each other and intersecting the vertical and horizontal axes of the body.

5. A valve-structure comprising a body having a plurality of tubular extensions, a bridge extending across the body and having threaded valve seats arranged therein at right angles to each other and intersecting the vertical and horizontal axes of the body, a bonnet adapted to fit such extensions, a valve having a stem adjustable in said bonnet, and a threaded plug designed to close one of the valve seats when the other is in use thereon and adapted to engage the threads in the said valve seats.

In testimony whereof I affix my signature in the presence of two witnesses.

JOHN L. SCHRODE.

Witnesses:
JOHN STILES,
H. A. ROPER.

---

Copies of this patent may be obtained for five cents each, by addressing the " Commissioner of Patents, Washington, D. C."